UNITED STATES PATENT OFFICE.

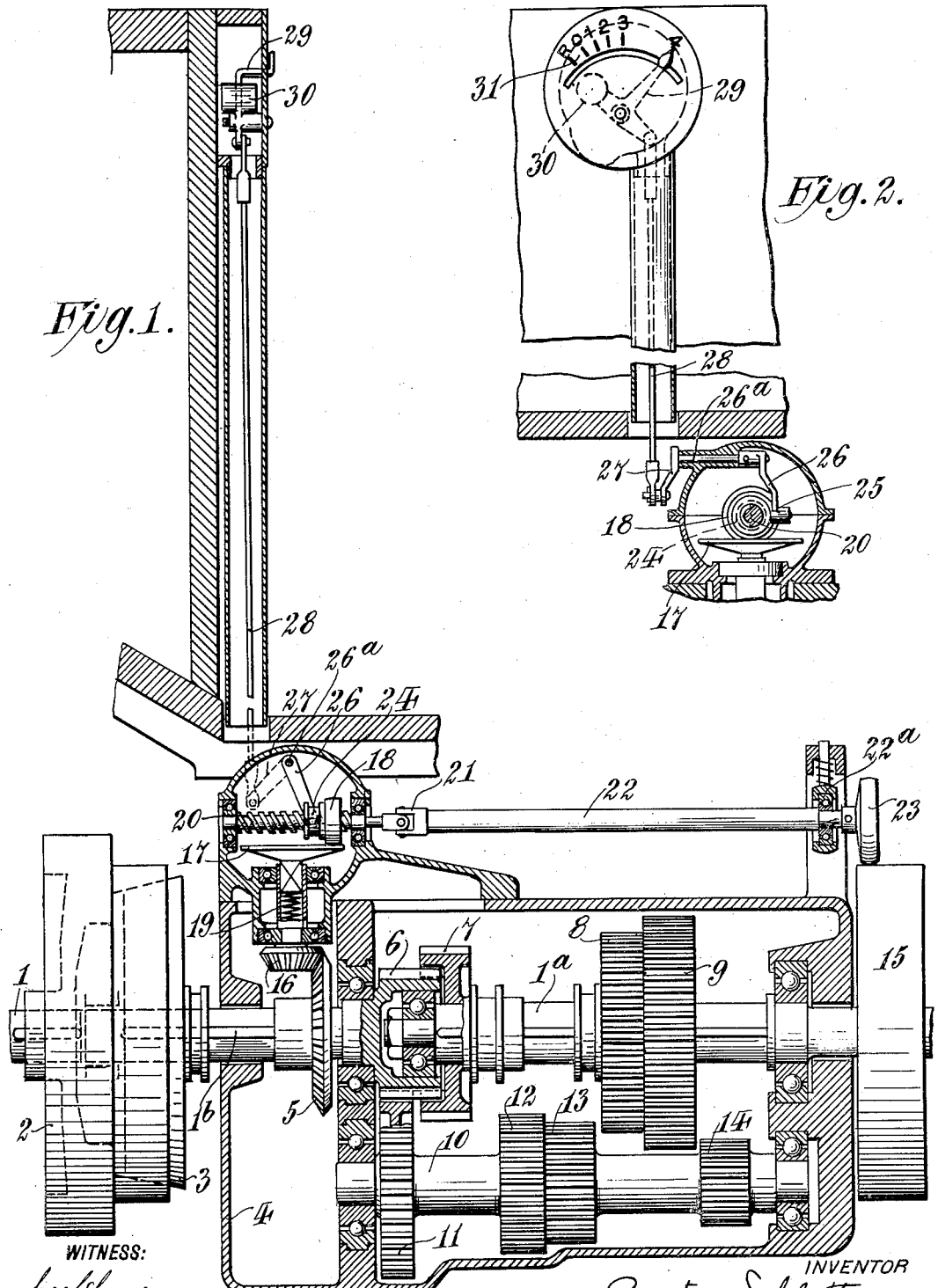

GUSTAV SCHLATTER, OF STEINACH, SWITZERLAND, ASSIGNOR TO FIRMA ADOLPHE SAURER, OF ARBON, SWITZERLAND.

INDICATOR FOR MULTIPLE-SPEED-TRANSMISSION GEARING.

1,273,932.

Specification of Letters Patent.

Patented July 30, 1918.

Application filed January 21, 1918. Serial No. 212,903.

*To all whom it may concern:*

Be it known that I, GUSTAV SCHLATTER, a citizen of the Republic of Switzerland, residing in Steinach, Switzerland, have invented certain new and useful Improvements in Indicators for Multiple-Speed-Transmission Gearing, of which the following is a specification, reference being had to the accompanying drawing, forming a part hereof.

In the manipulation of multiple speed transmission gearing, such as is commonly used in different types for motor vehicles, it is left to the judgment of the driver to determine the instant at which, in a change of speed, the gears of the transmission shall be thrown into mesh. If an attempt is made to enmesh the gears when one is rotating at a circumferential speed different from that of the other, there is not only a disagreeable noise but there is also danger of breaking or chipping the teeth of the gears. It is only when two gears to be enmeshed are rotating at substantially the same circumferential speed that the enmeshing is noiseless and free from the danger of breakage of the gear teeth. It is the object of this invention to provide means whereby it shall be indicated to the driver when the gears to be enmeshed have the same circumferential speed, and in accordance with the invention there is provided an indicating device which is influenced by the driving element and the driven element so that it will be displaced upon a change of the speed relations of the driving element and the driven element and will indicate when the two gears to be enmeshed have the same circumferential speed. The invention will be more fully explained hereinafter with reference to the accompanying drawing in which it is illustrated as embodied in a convenient and practical form and applied to a transmission gearing of a well known type. In the drawing—

Figure 1 is a view partly in side elevation and partly in longitudinal section showing a transmission gearing of well known type with an indicator which embodies the invention in operative relation therewith.

Fig. 2 is a view partly in elevation, as seen from the right hand in Fig. 1, and partly in transverse section, showing particularly portions of the indicating device without the transmission gearing.

In the embodiment and application of the invention illustrated in the drawing, the shaft 1 may be taken to be the driving element or the power shaft of a motor vehicle, adapted to be connected operatively with a short, alined shaft $1^b$, by the usual clutch, the members of which are indicated at 2, 3. The short, intermediate shaft $1^b$, which carries the clutch member 3, is mounted in suitable bearings in the transmission casing 4 and has fixed thereon a bevel gear 5 and a driving pinion 6. The driven element or driven shaft $1^a$ of the transmission gearing is mounted at one end in a bearing within the gear 6 and in a suitable bearing in the transmission casing and carries an external and internal gear 7 and gears 8 and 9, all of which are slidable on the shaft $1^a$, as usual in transmission gearing of this type, but are keyed to the shaft $1^a$ to rotate the latter. A jack shaft 10, also mounted in suitable bearings in the casing, carries gears 11, 12, 13 and 14. The gear 11 is constantly in mesh with the gear 6 so that the shaft 10 is always rotated with the shaft $1^b$, when the clutch 2, 3 is closed, at a speed which depends upon the ratio of the gears 6 and 11. When the internal member of the gear 7 is in mesh with the gear 6, as represented in the drawing, the shaft $1^a$ is driven at the fourth or highest speed, which is the speed of the driving shaft 1. If the gear 7 is shifted so that it meshes with the gear 12 on the jack shaft 10, the shaft $1^a$ is driven at the third speed. If the compound gear 8, 9 is shifted so that the gear 8 is in mesh with the gear 13, the shaft $1^a$ is driven at the second speed, and if it is shifted so that the gear 9 is in mesh with the gear 14, the shaft $1^a$ is driven at the first or lowest speed. The shaft $1^a$ is provided with a friction wheel 15 which, in the construction shown, may be a brake drum. As thus far described, except as to the provision of the bevel gear 5, the construction shown is that of an ordinary type of transmission gearing, does not involve the invention and may be replaced by any other suitable form of transmission gearing, in which there are provisions for change of speed relation between the driving element represented by the shaft 1, the shaft $1^b$ and the bevel gear 5, and the driven element represented by the shaft $1^a$ and the friction wheel 15. In a motor vehicle the speed of the shafts 1, 1ᵇ represents the speed of the motor and the speed of the shaft 1ᵃ and the friction wheel 15 represents the speed of the vehicle wheels.

The indicating device is influenced by the speed of the driving element and by the speed of the driven element, takes a predetermined position which is dependent upon the speed relation of the driving element and the driven element and is displaced with every change in such speed relation.

For the purpose of influencing the indicating device by the speed of the driving element the bevel gear 5 is made to mesh with a bevel gear 16 which drives a friction disk 17, yieldingly mounted with respect to the bevel gear 16 through a spring cushion 19. The friction disk 17 drives frictionally a friction wheel 18 which is mounted upon a screw-threaded spindle 20. The spindle 20 is mounted in a suitable bearing supported by the transmission casing and is connected by a universal joint 21 with a shaft 22 which is mounted near its farther end in a yielding bearing 22ᵃ and carries a friction wheel 23 in frictional driving contact with the friction wheel 15. Through this mechanism the indicating device is influenced by the speed of the driven element.

It will be obvious that if the friction wheel 18 rotates at the same speed as the spindle 20, no change in the position of the friction wheel on the spindle will take place, the speed of rotation of the friction wheel 18 being determined by its position with respect to the axis of the friction driving disk 17, and that any difference between the speed of rotation of the friction disk 18 and the spindle 20 will produce, through the operation of the screw thread, a corresponding movement of the friction wheel 18 with respect to the axis of the friction disk 17, in one direction or the other, such movement continuing until the friction wheel 18 reaches such a position with respect to the axis of the friction disk 17 that its speed of rotation is equalized with the speed of rotation of the spindle 20. This movement of the friction wheel 18, under the influence of the relative speeds of the driving element and the driven element, is taken advantage of to operate a suitable indicator, although the position of the friction wheel 18 itself, if it could be observed conveniently, would be a sufficient indication as to the time when, after two enmeshed gears have been disengaged, the circumferential speeds of the two gears to be enmeshed are the same, so that they can be enmeshed without noise or danger of breakage.

As a convenient means for translating the movement of the friction wheel 18 so that its position can be observed readily, the gear 18 is provided with a grooved hub 24 which is engaged by a stud 25 in one end of a lever arm 26 fixed on one end of a short shaft 26ᵃ which is mounted in a suitable bearing. The other end of the shaft 26ᵃ has fixed to it an arm 27 to which is connected a rod 28. The latter is connected with a pivoted pointer 29 which may be counter-balanced by a weight 30 and made to sweep over a suitably marked scale 31.

In further explanation of the operation of the device described, it may be assumed that it is desired to shift from the fourth or highest speed, when the internal member of the gear 7 is in mesh with the gear 6, as represented in the drawing, to the third speed. If the driving relation of the friction wheel 23 to the friction wheel 15 is in the ratio of 1:5 and that of the bevel gear 5 to the bevel gear 16 is 2:1, the friction wheel 18 (in the fourth or highest speed) takes such a position with respect to the friction disk 17 that its distance from the axis of the disk 17 is two and one half times its own radius, that is, that there is a transmission relation of 1:2.5. The friction wheel 18 then turns at the same rate of speed as the spindle 20 and there is no movement of the friction wheel 18 toward or from the axis of the friction disk 17. In this relation of parts the pointer 29 stands in the position shown in Fig. 2, indicating the fourth or highest speed. When the change to the third speed is to be effected the clutch 2, 3 is opened and the internal member of the gear 7 is disengaged from the gear 6. By reason of the momentum of the vehicle or of the parts connected with the driven element the circumferential speed of the external member of the gear 7 is at this instant greater than the circumferential speed of the gear 12, with which it is to be enmeshed, so that engagement of the gears 7 and 12 should not then be effected. The driving element is therefore speeded up slightly, as by movement of the usual accelerator, until the circumferential speed of the gear 12 becomes substantially equal to the circumferential speed of the external member of the gear 7, when the shifting movement of the gear 7 can be continued safely to enmesh such external member of the gear 7 with the gear 12. Since the speed of rotation of the driven element 1ᵃ continues practically the same as before, during the short space of time required, the influence of the driven element upon the driving wheel 18 for the indicator is the same, but through the speeding up of the motor, after the clutch is let in or closed, the speed of the friction disk 17 is increased and the friction wheel 18 is made to rotate slightly faster than the screw-threaded spindle 20 and the relative rotation of the friction wheel 18 and the spindle 20, which is thus produced, causes, through the operation of the screw thread, a movement of the friction wheel 18 toward the axis of the friction disk 17 until the speed of rotation of the friction wheel 18 becomes the same as the speed of rotation of the spindle 20. When this is accomplished the pointer 29 will stand at the mark 3 of the scale and the driver will be informed thereby that the circumferential speed of the external member of the gear 7 and the circumferential speed of the gear 12 are equal, so that the two gears can be enmeshed safely. In like manner a change may be made from the third speed to the second speed and so on. The operation in changing from a lower to a higher speed will be obvious, the motor being speeded up before the opening of the clutch and the disengagement of the two gears which are to be disengaged so that, through the momentum of the driven element, when the clutch 2, 3 is open, the gear on the shaft 1ª, such as the gear 8, shall have the same circumferential speed as the corresponding gear 13 on the shaft 10, the motor slowing down as usual. Through such change in the speed relations of the driving element and the driven element, the pointer will be moved to that mark on the scale which will indicate to the driver the instant when he can safely continue the shifting of the gears 8, 9 to enmesh the gear 8 with the gear 13.

It is to be understood that the indicating mechanism may be varied in construction to suit different conditions of use, that the indicating device may be employed with variable speed gearing of different types, and that the invention therefore, except so far as indicated in the claims, is not limited to the particular construction shown and described herein.

I claim as my invention:

1. In an apparatus of the character described, the combination with a driving element, a driven element and means for varying the relative speeds of the driving element and the driven element, of a single indicator, movable in either direction to different positions to indicate speed relations of such elements, means to actuate the indicator, connections whereby the direction of movement of the indicator is influenced by the speed of the driving element, and connections whereby the direction of movement of the indicator is influenced by the speed of the driven element.

2. In an apparatus of the character described, the combination with a driving element, a driven element and means for varying the relative speeds of the driving element and the driven element, of a first rotatable member, a second rotatable member, devices whereby one of said rotatable members is shifted with respect to the other by a change in the relative speed of rotation of said members, means to drive one of said members from the driving element and means to drive the other of said members from the driven element.

3. In an apparatus of the character described, the combination with a driving element, a driven element and means for varying the relative speeds of the driving element and the driven element, of a first rotatable member, a second rotatable member, devices whereby one of said rotatable members is shifted with respect to the other by a change in the relative speed of rotation of said members, means to drive one of said members from the driving element, means to drive the other of said members from the driven element and an indicator operatively connected with said shiftable member.

4. In an apparatus of the character described, the combination with a driving element, a driven element and means for varying the relative speeds of the driving element and the driven element, of a rotatable spindle, a rotatable member mounted on said spindle and shiftable longitudinally thereon, devices whereby said shiftable member is shifted through a difference in the speed of rotation of said member and said spindle, means to drive said shiftable member from one of said first named elements and means to drive said spindle from the other of said first named elements.

5. In an apparatus of the character described, the combination with a driving element, a driven element and means for varying the relative speeds of the driving element and the driven element, of a rotatable spindle, a rotatable member mounted on said spindle and shiftable longitudinally thereon, devices whereby said shiftable member is shifted through a difference in the speed of rotation of said member and said spindle, means to drive said shiftable member from one of said first named elements, means to drive said spindle from the other of said first named elements, and an indicator operatively connected with said shiftable member.

6. In an apparatus of the character described, the combination with a driving element, a driven element and means for varying the relative speeds of the driving element and the driven element, of a rotatable screw-threaded spindle, a member mounted on the spindle and rotatable independently thereof, connections whereby said spindle is rotated from one of said first named elements and connections whereby said rotatable member is rotated from the other of said first named elements.

7. In an apparatus of the character described, the combination with a driving element, a driven element and means for varying the relative speeds of the driving element and the driven element, of a driving disk, means to drive the same from one of said first named elements, a rotatable spindle, means to drive the same from the other of said first named elements, a wheel mounted on said spindle in driving engagement with said disk and shiftable longitudinally on the spindle toward and from the axis of the disk, and devices whereby said wheel is shifted on said spindle through a difference in the speed of rotation of the wheel and the spindle.

8. In an apparatus of the character described, the combination with a driving element, a driven element and means for varying the relative speeds of the driving element and the driven element, of a driving disk, means to drive the same from one of said first named elements, a rotatable spindle, means to drive the same from the other of said first named elements, a wheel mounted on said spindle in driving engagement with said disk and shiftable longitudinally on the spindle toward and from the axis of the disk, devices whereby said wheel is shifted on said spindle through a difference in the speed of rotation of the wheel and the spindle, and an indicator operatively connected with said shiftable wheel.

9. In an apparatus of the character described, the combination with a driving element, a driven element and means for varying the relative speeds of the driving element and the driven element, of a friction disk, means to drive the same from one of said first named elements, a screw-threaded spindle, means to drive the same from the other of said first named elements and a friction wheel mounted on said spindle in frictional engagement with said disk and shiftable on said spindle through a difference in the speeds of rotation of said disk and said spindle.

10. In an apparatus of the character described, the combination with a driving element, a driven element and means for varying the relative speeds of the driving element and the driven element, of a friction disk, means to drive the same from one of said first named elements, a screw-threaded spindle, means to drive the same from the other of said first named elements, a friction wheel mounted on said spindle in frictional engagement with said disk and shiftable on said spindle through a difference in the speeds of rotation of said disk and said spindle and an indicator operatively connected to said friction wheel.

This specification signed this 12th day of December, A. D. 1917.

GUSTAV SCHLATTER.